US012046788B2

(12) United States Patent
Alsolamy et al.

(10) Patent No.: US 12,046,788 B2
(45) Date of Patent: Jul. 23, 2024

(54) METASURFACE-BASED CONVERTERS FOR CONTROLLING GUIDED MODES AND ANTENNA APERTURES

(71) Applicant: THE REGENTS OF THE UNIVERSITY OF MICHIGAN, Ann Arbor, MI (US)

(72) Inventors: Faris Alsolamy, Ann Arbor, MI (US); Anthony Grbic, Ann Arbor, MI (US)

(73) Assignee: The Regents of The University of Michigan, Ann Arbor, MI (US)

( * ) Notice: Subject to any disclaimer, the term of this patent is extended or adjusted under 35 U.S.C. 154(b) by 438 days.

(21) Appl. No.: 17/474,136

(22) Filed: Sep. 14, 2021

(65) Prior Publication Data

US 2022/0085474 A1 Mar. 17, 2022

Related U.S. Application Data

(60) Provisional application No. 63/077,797, filed on Sep. 14, 2020.

(51) Int. Cl.
*H01P 1/16* (2006.01)

(52) U.S. Cl.
CPC .................................... *H01P 1/16* (2013.01)

(58) Field of Classification Search
CPC ........................................................ H01P 1/16
See application file for complete search history.

(56) References Cited

U.S. PATENT DOCUMENTS 7,990,327 B2 8/2011 Romanofsky
9,711,831 B2 * 7/2017 Driscoll ................ G02B 1/002
9,831,557 B2 11/2017 Park et al.

OTHER PUBLICATIONS

Y. Z. Cheng, C. Fang, X. S. Mao, R. Z. Gong and L. Wu, "Design of an Ultrabroadband and High-efficiency Reflective Linear Polarization Convertor at Optical Frequency," in IEEE Photonics Journal, vol. 8, No. 6, pp. 1-9, Dec. 2016 (Year: 2016).*

(Continued)

*Primary Examiner* — Andrea Lindgren Baltzell
*Assistant Examiner* — Kimberly E Glenn
(74) *Attorney, Agent, or Firm* — Harness, Dickey & Pierce, P.L.C.

(57) ABSTRACT

Electromagnetic fields within a waveguide can be expressed in terms of the complex amplitudes of the electromagnetic modes it supports. The electromagnetic fields can be shaped by controlling the complex amplitudes of modes. Here, mode-converting metasurfaces are designed to transform a set of incident modes on one side to a different set of desired modes on the opposite side of the metasurface. A mode-converting metasurface comprises multiple inhomogeneous (spatially-varying) reactive electric sheets that are separated by dielectric spacers. The reactance profile of each electric sheet to perform the needed mode conversion is found through optimization. The optimization routine takes advantage of a multimodal solver that uses two main concepts: modal network theory and a discrete Fourier transform algorithm. With modal network theory, the modes can be translated between the electric sheets using matrix multiplication. Additionally, modal network theory accounts for the multiple reflections between the reactive electric sheets, as well as coupling between the sheets.

24 Claims, 12 Drawing Sheets

(56) References Cited

OTHER PUBLICATIONS

T. -J. Huang, J. -Y. Liu, L. -Z. Yin, F. -Y. Han and P. -K. Liu, "Efficient Waveguide Mode Conversions Based on Phase-Gradient Metasurfaces," 2018 43rd International Conference on Infrared, Millimeter, and Terahertz Waves (IRMMW-THz), Nagoya, Japan, 2018, pp. 1-2 (Year: 2018).*

X. Yu, X. Gao, W. Qiao, L. Wen and W. Yang, "Broadband Tunable Polarization Converter Realized by Graphene-Based Metamaterial," in IEEE Photonics Technology Letters, vol. 28, No. 21, pp. 2399-2402, 1 Nov. 1, 2016 (Year: 2016).*

B. O. Zhu, "Synthesizing Metasurfaces with Multi-Layer Electric Impedance Surfaces," 2018 IEEE International Conference on Computational Electromagnetics (ICCEM), Chengdu, China, 2018, pp. 1-3 (Year: 2018).*

Z. Li et al., "Controlling propagation and coupling of waveguide modes using phase-gradient metasurfaces," Nat. Nanotechnol., vol. 12, No. 7, pp. 675-683, Jul. 2017.

Y. Huang et al., "Polarization conversion of metasurface for the application of wide band low- profile circular polarization slot antenna," Appl. Phys. Lett., vol. 109, No. 5, p. 054101, Aug. 2016.

M. Faenzi et al., "Metasurface Antennas: New Models, Applications and Realizations," Sci. Rep., vol. 9, No. 1, pp. 1-14, Dec. 2019.

F. Alsolamy and A. Grbic, "A Metasurface Based Mode Converter," 2019 Thirteenth International Congress on Artificial Materials for Novel Wave Phenomena (Metamaterials), Rome, Italy, 2019, pp. X-029-X-031.

C. Henry, "Satellite antenna companies divided on near-term feasibility of cheap flat panels", Spacenews, 2018.

* cited by examiner

METASURFACE-BASED CONVERTERS FOR CONTROLLING GUIDED MODES AND ANTENNA APERTURES

CROSS-REFERENCE TO RELATED APPLICATIONS

This application claims the benefit of U.S. Provisional Application No. 63/077,797, filed on Sep. 14, 2020. The entire disclosure of the above application is incorporated herein by reference.

FIELD

The present disclosure relates to metasurface-based mode converting devices.

BACKGROUND

Microwave network theory is an essential tool in analyzing and designing microwave circuits. In his paper on the history of microwave field theory, Oliner argued that "it is in fact this capability of phrasing microwave field problems in terms of suitable networks that has permitted the microwave field to make such rapid strides". In microwave networks, voltages and currents are defined at the network ports. Then, circuit theory or transmission-line theory is used to relate the voltages and currents at the ports to each other. The relation between the port voltages and currents of the network can be represented by a matrix. Several different matrices (network parameters) can be used to describe a given network. These matrices include the impedance matrix Z, the admittance matrix Y, the scattering matrix S, etc. However, depending on the analysis to be performed or application, some matrices are more suitable than others.

Network analysis has not only been used to solve microwave circuits. It has also been employed to analyze modal networks. In modal networks, the voltages and currents at the circuit ports are replaced by the modal voltages and the modal currents of the waveguide ports that represent the complex coefficients of the modes supported. Modal networks can be described by the same matrices used to describe microwave networks. As a result, modal network matrices and microwave network matrices share similar properties. For instance, a lossless reciprocal modal network is described by a modal impedance matrix Z that is symmetric and purely imaginary. The modal network formulation was originally developed to treat waveguide discontinuities in the context of the mode matching technique (MMT). By recasting the MMT solution into a modal network, a terminal description of a discontinuity can be obtained rather than a complete field description. A terminal description of a discontinuity corresponds to a modal network that only relates the modal voltages and currents of the accessible modes to each other. While the ports representing the inaccessible (localized) modes are terminated in their wave impedances.

Waveguide discontinuities can be classified into different classes. One particular class of problems, that has been studied extensively using the modal network formulation, is the waveguide junction. The properties of the modal scattering matrix S for waveguide junctions have been discussed in literature. It has been shown that the modal scattering matrix S is not always unitary unless all the modes considered are propagating. The modal admittance matrix Y has also been derived for waveguide junctions and equivalent circuit models constructed for isolated and interacting waveguide junctions.

This section provides background information related to the present disclosure which is not necessarily prior art.

SUMMARY

This section provides a general summary of the disclosure, and is not a comprehensive disclosure of its full scope or all of its features.

In one aspect, a mode converting device is presented. The mode converting device is comprised of: a waveguide supporting electromagnetic fields therein and defining a longitudinal axis; and multiple electric sheets associated with the waveguide and configured to interact with the electromagnetic fields incident thereon. The electromagnetic fields are comprised of a set of modes and the multiple electric sheets operate to change at least one mode of the electromagnetic fields. Each of the multiple electric sheets is arranged transverse to longitudinal axis of the electromagnetic fields and parallel to each other. Each of the multiple electric sheets includes patterned features, such that dimensions of the patterned features are less than wavelength of the electromagnetic fields. Spacing between each of the multiple electric sheets is also less than or on the order of the wavelength of the electromagnetic fields. In some embodiments, spacing between patterned features varies across each of the multiple electric sheets.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
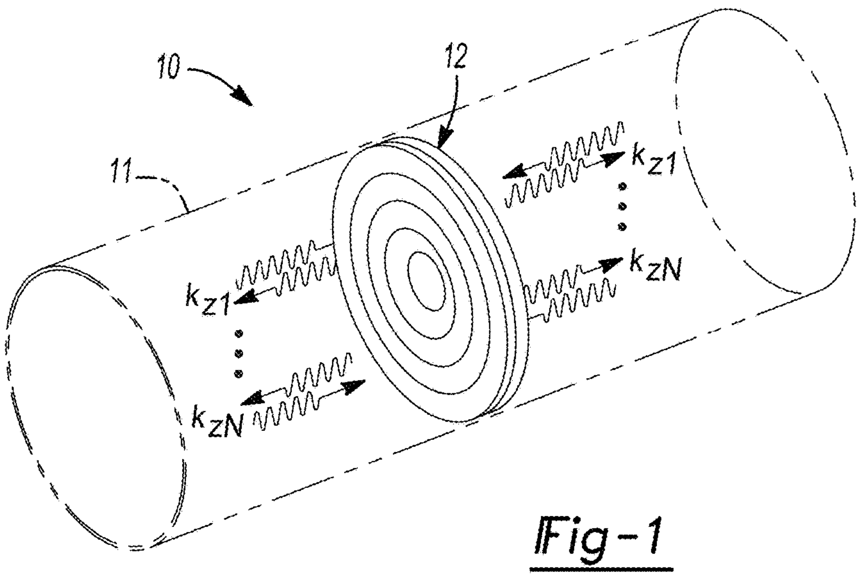
FIG. 1 is a diagram depicting a cascaded sheet metasurface placed in an over-molded cylindrical waveguide.

FIG. 1 depicts a mode converting device 10 in accordance with this disclosure. The mode converting device 10 is comprised generally of a waveguide 11 and a metasurface 12. In this example, the metasurface 12 is defined by multiple electric sheets and the waveguide is an overmolded cylinder. In this disclosure, modal network theory is extended beyond conventional waveguide discontinuities. Modal network formulation is used to analyze the isotropic metasurface 12 that is placed perpendicular to the propagation axis of the waveguide as seen in FIG. 1. Although the waveguide cross section remains uniform, the metasurface 12 introduces a field discontinuity. In fact, spatially-varying (inhomogeneous) metasurfaces can be used to convert/transform waveguide modes. As will be shown in detail below using the modal network formulation, lossless and reflection-less mode converting devices can be synthesized with metasurfaces. A mode converting device transforms (at least one mode in) a set of incident modes on one side to another set of desired modes on the opposite side of the metasurface. For illustration purposes, the discussion set forth below is limited to cylindrical waveguides and azimuthally-invariant transverse magnetic (TM) modes. Cylindrical waveguides are considered not only because they can be easily analyzed but also because they have some interesting applications. For example, they can be used to generate non-diffractive Bessel beams, or design high gain, low-profile antennas. Other shapes for the waveguide are contemplated by this disclosure. Applications for a mode converting device 10 which does not require a waveguide are also contemplated by this disclosure.

In electromagnetics problems, boundary conditions are typically stipulated in the spatial domain. The Discrete Hankel Transform (DHT) allows boundary conditions in the cylindrical basis to be transformed from spatial to modal (spectral) domains, or vice versa, with simple matrix operations. Using the DHT, closed-form expressions will be derived for modal matrices. On the other hand, network analysis allows fields to be computed and propagated efficiently in the modal domain using simple matrix operations. Together, the DHT and modal network analysis are ideal tools for analyzing waveguide discontinuities. In this disclosure, they are both used to efficiently analyze metasurface in waveguide problems, and rapidly optimize metasurface designs.

Modal matrices (network parameters) are used to describe modal networks. These matrices are of the same form as those used in microwave networks or polarization converting devices. However, they relate modal quantities rather than circuit quantities or polarization states. Hence, the distinct name 'modal matrices'. It is more instructive to define the modal matrices within the context of the problem at hand: the design of a mode converting device.

Figure 2:
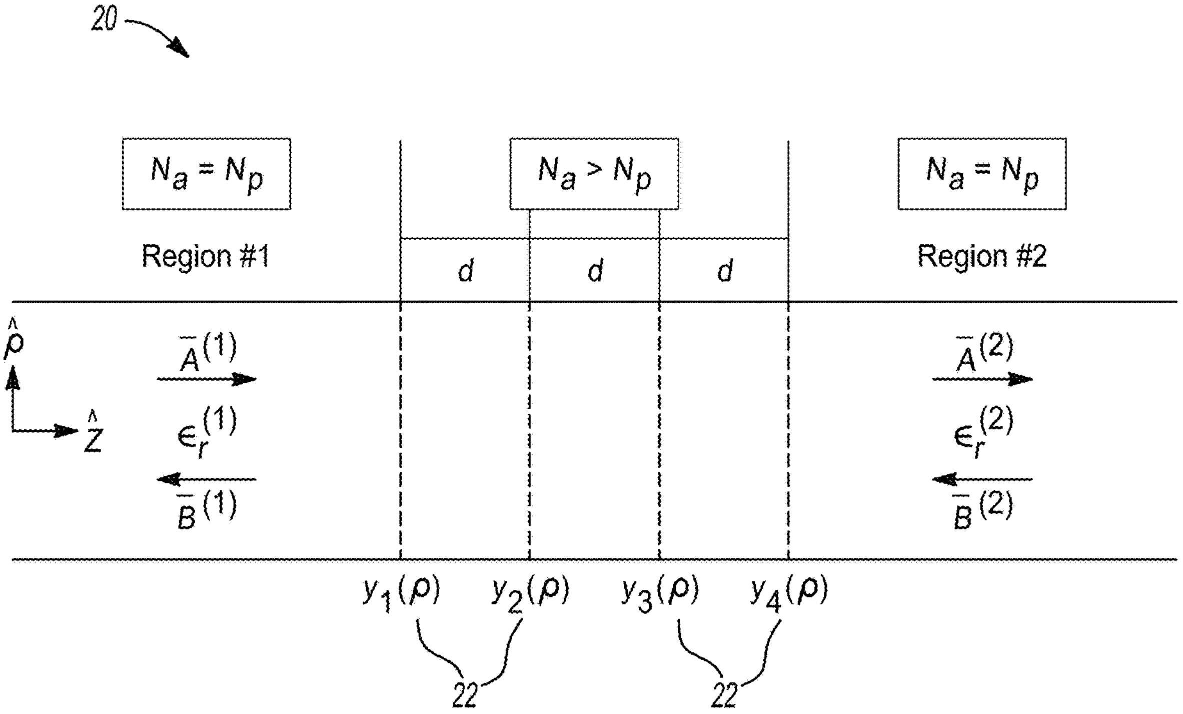
FIG. 2 is a side view of an example embodiment of a mode converting device.

FIG. 2 illustrates an example embodiment of a mode converting device 20. In this example embodiment, four electric sheets 22 are configured to receive electromagnetic radiation propagating along a propagation/waveguide axis 2, where each of the electric sheets has a planar surface arranged perpendicular to the propagation axis and parallel to the other electric sheets. Thus, the metasurface is comprised of multiple, radially-varying electric sheets 22 and each of these sheets is described by an admittance profile y(ρ). These electric sheets are separated by dielectric spacers with thickness d. The spacing between each metasurface (electric sheet) is less than or on the order of the wavelength of the electromagnetic radiation.

Figure 3C:
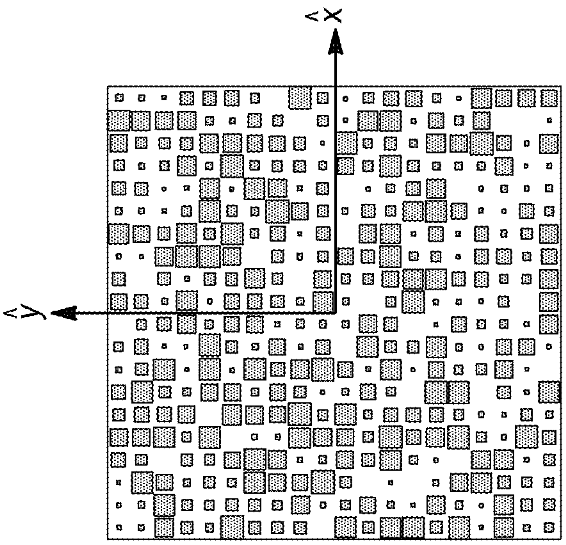
FIGS. 3A-3C illustrate metasurfaces with different patterns of susceptance features.
Figure 3B:
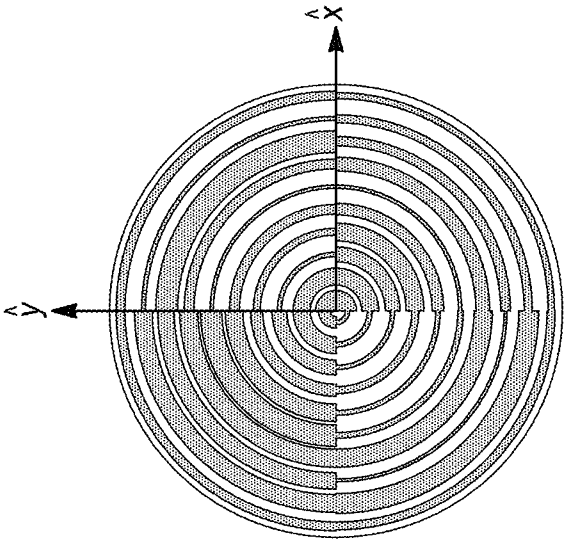
Figure 3A:
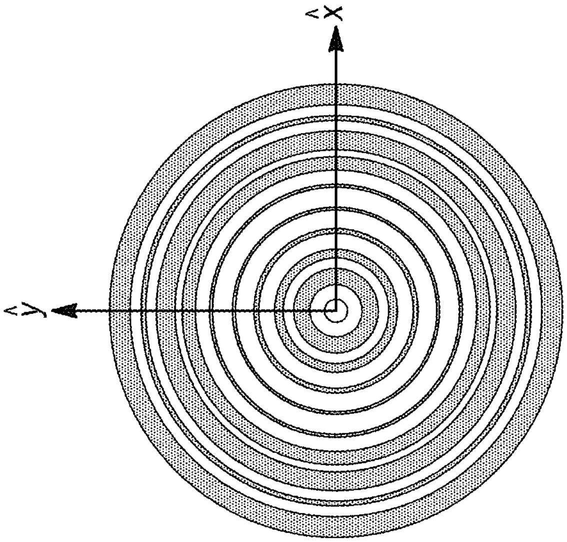

With reference to FIGS. 3A-3C, each electric sheet includes patterned features, such that dimensions of the patterned features are less than wavelength of the electromagnetic radiation. In one example, the features are comprised of metal deposited on a substrate although other types of materials (e.g., dielectrics) can be used. In FIGS. 3A and 3B, the metasurfaces are in shape of a disk. In FIG. 3A, the patterned features are defined as a series of concentric rings, where the size of the rings changes as a function of the radius. In FIG. 3B, the patterned features are also defined as a series of concentric rings but the size of the rings changes as a function of the radius and the azimuthal angle. In FIG. 3C, the electric sheet is in shape of a rectangle and the patterned features are defined as square patches of different sizes. Other shapes for the metasurfaces as well as other shapes and patterns for the features fall within the scope of this disclosure.

Returning to FIG. 2, the multiple electric sheets 22 (i.e. metasurface) divide the waveguide into two main regions (regions 1 and 2), and multiple inner regions between the electric sheets. Each region supports different modes, and therefore has different modal coefficients associated with it. An equivalent multiport modal network can be used to describe the relations between the modal coefficients of one or more adjacent regions. To illustrate, modal matrices will be defined relating the modal coefficients in the two main regions, region 1 and region 2. Nevertheless, the same exact definitions apply to any other region.

Figure 4A:
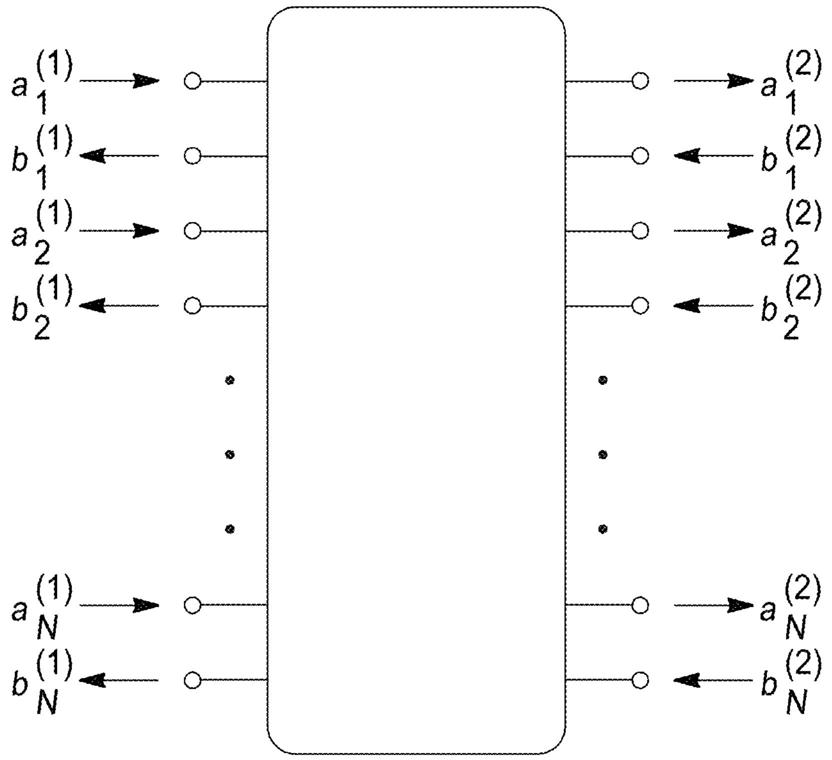
FIGS. 4A and 4B are diagrams showing a multiport modal network representation of a cascaded sheet metasurface and a reduced modal network representation of a cascaded sheet metasurface, respectively.

The modal network, depicting in FIG. 4A, relates the modes in region 1 and region 2 to each other. Each port of this modal network corresponds to a waveguide mode in either region 1 or region 2. The characteristic impedance of each port is equal to the modal wave impedance of the mode represented by the port. In region p, the forward traveling modal coefficients $a_n^{(p)}$ and the backward traveling modal coefficients $b_n^{(p)}$ can be arranged into vectors as follows, $$\overline{A}^{(p)}=[a_1^{(p)},a_1^{(p)}, \ldots ,a_N^{(p)}]^T \tag{1}$$

$$\overline{B}^{(p)}=[b_1^{(p)},b_1^{(p)}, \ldots ,b_N^{(p)}]^T \tag{2}$$

where N is the highest mode that is considered. The modal voltages (or, equivalently, the electric field modal coefficients) in region p, $\tilde{E}_n^{(p)}$, can also be arranged into a vector as follows, $$\tilde{\bar{E}}^{(p)}=[\tilde{E}_1^{(p)},\tilde{E}_1^{(p)}, \ldots ,\tilde{E}_N^{(p)}]^T \tag{3}$$

The modal currents (or, equivalently, the magnetic field modal coefficients) in region$_p$, $\tilde{H}_n^{(p)}$, can be similarly arranged into a vector, $$\tilde{\bar{H}}^{(p)}=[\tilde{H}_1^{(p)},\tilde{H}_1^{(p)}, \ldots ,\tilde{H}_N^{(p)}]^T \tag{4}$$

where, $g^{(p)}$ is a diagonal normalization matrix that takes the following form, $$g^{(p)} = \begin{bmatrix} \sqrt{\eta_1^{(p)}} & \ldots & 0 \\ \vdots & \ddots & \vdots \\ 0 & \ldots & \sqrt{\eta_N^{(p)}} \end{bmatrix}. \tag{6}$$

In (6), $\eta_n^{(p)}$ represents the modal wave impedance of the nth mode in region p.

Now, let's define the modal matrices that will be used throughout the disclosure. These modal matrices will be defined as block matrices, where each submatrix relates one of the vectors in (1), (2), (3), or (4) to another one. The reference planes of the ports (modes) are assumed to be at the two outermost sheets of the metasurface. Namely, just before $y_1(\rho)$ for modes in region 1, and just after $y_4(\rho)$ for modes in region 2 (see FIG. 4A).

The modal ABCD matrix relates the total (summation of incident and reflected) modal voltages and modal currents in one region to the modal voltages and modal currents in the other region, $$\begin{bmatrix} \tilde{\bar{E}}^{(1)} \\ \tilde{\bar{H}}^{(1)} \end{bmatrix} = \begin{bmatrix} A & B \\ C & D \end{bmatrix} \begin{bmatrix} \tilde{\bar{E}}^{(2)} \\ \tilde{\bar{H}}^{(2)} \end{bmatrix}. \tag{7}$$

The modal wave matrix M relates the incident and the reflected modes in one region to the incident and the reflected modes in the other region, $$\begin{bmatrix} \bar{A}^{(1)} \\ \bar{B}^{(1)} \end{bmatrix} = \begin{bmatrix} M_{11} & M_{12} \\ M_{21} & M_{22} \end{bmatrix} \begin{bmatrix} \bar{A}^{(2)} \\ \bar{B}^{(2)} \end{bmatrix}. \tag{8}$$

The modal ABCD matrix can be transformed to the modal wave matrix M using the following transformation, $$M = \begin{bmatrix} g^{(1)} & g^{(1)} \\ (g^{(1)})^{-1} & -(g^{(1)})^{-1} \end{bmatrix}^{-1} \tag{9}$$

$$ABCD = \begin{bmatrix} g^{(2)} & g^{(2)} \\ (g^{(2)})^{-1} & -(g^{(2)})^{-1} \end{bmatrix}^{-1}.$$

The modal scattering matrix S relates the reflected modes in both regions to the incident modes in both regions, $$\begin{bmatrix} \bar{B}^{(1)} \\ \bar{A}^{(2)} \end{bmatrix} = \begin{bmatrix} S_{11} & S_{12} \\ S_{21} & S_{22} \end{bmatrix} \begin{bmatrix} \bar{A}^{(1)} \\ \bar{B}^{(2)} \end{bmatrix}. \tag{10}$$

Here, one can adopt the following convention for the S matrix, $$S_{kp} = \begin{bmatrix} S_{kp}^{(1,1)} & \ldots & S_{kp}^{(1,N)} \\ \vdots & \ddots & \vdots \\ S_{kp}^{(N,1)} & \ldots & S_{kp}^{(N,N)} \end{bmatrix}, \tag{11}$$

where, for $S_{kp}^{(i,j)}$ the subscripts k, and p denote the measurement and the excitation regions, respectively, and the superscripts (i,j) denote the measured and the excited modes, respectively. The M matrix can be transformed to the S matrix and vice versa, using the following relations, $$S = \begin{bmatrix} 0 & M_{11} \\ I & M_{21} \end{bmatrix}^{-1} \begin{bmatrix} I & -M_{12} \\ 0 & -M_{22} \end{bmatrix} \tag{12}$$

$$M = \begin{bmatrix} I & 0 \\ S_{11} & S_{21} \end{bmatrix} \begin{bmatrix} S_{21} & S_{22} \\ 0 & I \end{bmatrix}^{-1}. \tag{13}$$

where, I is the N×N identity matrix. It should be noted that all the aforementioned modal matrices are of the size 2N×2N.

Attention should be drawn to the fact that not all N modes, considered in (1) and (2), are detectable everywhere in a region. Some of these modes exist only in very close proximity to the individual electric sheets that compose the metasurface. These modes adhere to the sheet's surface and do not interact with adjacent sheets. This fact leads to the notion of accessible modes and inaccessible modes. For the individual sheets of the metasurface, shown in FIG. 2, an accessible mode is a mode that interacts with an adjacent sheet. While an inaccessible mode is a mode that adheres to the sheet's surface and does not interact with an adjacent sheet. This classification of waveguide modes into accessible and inaccessible modes, is more general than the well-known classification into propagating and evanescent modes. Since an accessible mode could be an evanescent mode if the separation distance d is comparable to the decay length of the mode, it should be kept in mind that the accessible modes of the individual sheets and the accessible modes of the metasurface (multiple cascaded sheets) are generally different. For the metasurface (the cascaded sheets as a whole), shown in FIG. 2, the accessible modes are only the propagating modes, since the metasurface is assumed to be isolated in the waveguide.

Figure 4B:
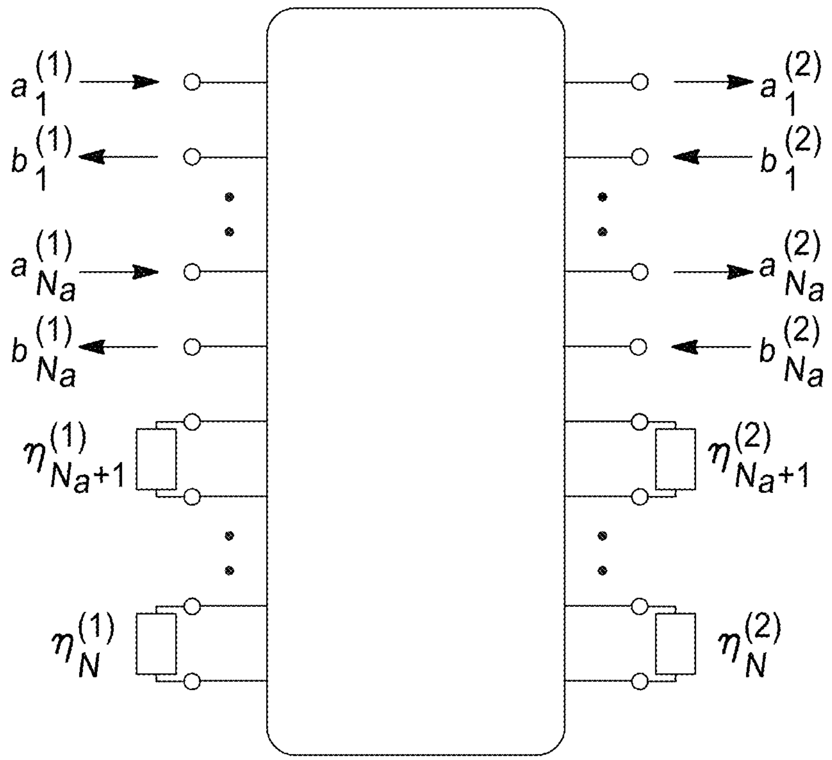

Ports that represent the inaccessible modes should be terminated in their modal wave impedances, see FIG. 4B. Therefore, a reduced modal network that only considers the accessible modes (see FIG. 4B), can be obtained from the original modal network shown in FIG. 4A. Terminating the ports that represent the inaccessible modes with modal wave impedances results in, $$\bar{A}_{in}^{(1)}=\bar{0} \tag{14}$$

$$\bar{B}_{in}^{(2)}=\bar{0} \tag{15}$$

where, $\bar{A}_{in}^{(1)}$ is a subvector of the vector $\bar{A}^{(1)}$ that contains the inaccessible modes, and $\bar{B}_{in}^{(2)}$ is defined similarly. Based on the two expressions, (14) and (15), it is straightforward to show that the reduced modal scattering S' can be written as, $$S' = \begin{bmatrix} S_{11}^{aa} & S_{12}^{aa} \\ S_{21}^{aa} & S_{22}^{aa} \end{bmatrix}, \quad (16)$$

where, $s_{kp}^{aa}$ is the submatrix of $S_{kp}$ that pertains only to the accessible modes. The reduced modal wave matrix M' cannot be constructed by simply choosing the elements in the original modal wave matrix M that pertain to the accessible modes. Rather, the original modal wave matrix M should be transformed to the modal scattering matrix S using (12). Then S should be reduced to S' using (16), and finally S' transformed to M' using (13). A similar procedure can be used to find the reduced modal ABCD matrix.

Metasurfaces are the 2D equivalent of metamaterials, since they have negligible thickness compared to the wavelength. Because of their low profile and corresponding low-loss properties, metasurfaces have been used in numerous applications over the last decade. Applications of metasurfaces include, antenna design, polarization conversion, and wavefront manipulation. Typically, metasurfaces are realized as a 2D arrangement of subwavelength cells. In practice, the cells are composed of a patterned metallic cladding on a thin dielectric substrate. The patterned metallic cladding can be homogenized as an electric sheet admittance. It is designed to have tailored reflection and transmission properties.

Unlike metamaterials, which are characterized by equivalent material parameters, metasurfaces are characterized by surface boundary conditions. These surface boundary conditions are referred to as GSTCs (Generalized Sheet Transition Conditions). The GSTCs can be derived by modeling the metasurface's cells as polarizable particles. The local dipole moments of the cells can be related to the local fields using polarizability tensors. Exploiting the equivalence between the dipole moments and surface currents, the following matrix form of the GSTCs can be obtained, $$\begin{bmatrix} J^s \\ M^s \end{bmatrix} = \begin{bmatrix} Y & X \\ Y & Z \end{bmatrix} \begin{bmatrix} E \\ H \end{bmatrix}. \quad (17)$$

The vectors on the left side of (17) denote the surface currents at the metasurface, while the vectors on the right side denote the average fields across the metasurface. The 2×2 submatrices Y and Z represent the electric admittance and magnetic impedance of the metasurface, respectively. Likewise, the 2×2 submatrices X and Y represent the magnetoelectric response of the metasurface. For a reciprocal metasurface, $Y=Y^T$, $Z=Z^T$, and $X=Y^T$. For lossless metasurface Re(Y)=Re(Z)=Im(X)=0. In the case of inhomogeneous metasurfaces, all the vector and matrix elements in (17) are written as a continuous function of space. It should be noted that this form of the GSTCs represents metasurfaces without normal polarizabilities.

In synthesis problems, the metasurface can be modeled either by a single bianisotropic sheet boundary condition, or as a cascade of electric sheet admittances. In the single bianisotropic boundary model, the metasurface is replaced by a fictitious surface that has, in general, non-vanishing submatrices Y, Z, and X. In the cascaded electric sheet model, the metasurface is modeled by a cascade of simple (readily realizable) electric sheets admittances (see FIG. 2). The cascade of sheets can be designed to exhibit electric, magnetic and magnetoelectric properties. For each sheet, the only non-vanishing submatrix in (17) is the Y submatrix. As it was pointed out earlier, here the metasurface is modeled with cascaded electric sheets admittances as shown in FIG. 2.

The cascaded electric sheet model is chosen rather than the idealized single bianisotropic boundary (GSTC) model for the following two main reasons. First, in the cascaded sheet model, the power normal to the metasurface only needs to be conserved globally for a lossless metasurface, not locally; whereas, in the bianisotropic boundary model, normal power must be conserved not just globally but also locally for a lossless metasurface. Indeed, the local power continuity condition across the single bianisotropic boundary unnecessarily restricts metasurface functionality. For instance, a reflectionless metasurface-based mode converting device has not been synthesized with a single bianisotropic boundary. However, such a device can be synthesized with the cascaded electric sheet model, as it will be shown below. The second reason is that the cascaded sheet model is more compatible with the physical realization of the metasurface. In most cases, metasurfaces are implemented as a cascade of patterned metallic claddings regardless of the synthesis approach used. This is due to the fact that such metasurfaces can be manufactured using standard planar fabrication approaches. The cascaded sheets are simply a homogenized model of this practical realization. An important benefit of the model is that it also accounts for spatial dispersion. This is in contrast to the single bianisotropic boundary which is a fictitious, local boundary condition. In summary, the single bianisotropic boundary model imposes additional constraints on the metasurface functionality compared to the cascaded sheet model, does not account for spatial dispersion, and complicates the practical realization of the metasurface.

In waveguide problems, it is more convenient to construct solutions in the modal (spatial spectrum) domain rather than the spatial domain, given that the spatial spectrum is discrete. As a result, the modal network formulation is regarded as a powerful tool for solving waveguide problems. Conversely, metasurface problems are best handled in the spatial domain, since boundary conditions representing the metasurface are typically given in the spatial domain. Consequently, an efficient method to go from the spatial domain to the modal domain and vice versa is essential to rapidly solving and optimizing electromagnetic problems that involve metasurfaces and waveguide structures.

In cylindrical waveguides, the Hankel transform and its inverse relate azimuthally invariant spatial and modal domains. Conventionally, the Hankel transform is computed using numerical integration. Computing the Hankel transform via numerical integration is computationally expensive, especially in synthesis problems. Alternatively, the Hankel transform can be approximated using the Discrete Hankel Transform (DHT). The DHT only utilizes discrete points in the spatial and the modal domains to accurately compute the Hankel transform and its inverse. It does this via matrix multiplications, which makes the DHT compatible with the modal network (matrix) description of the electromagnetic problems.

Figure 5:
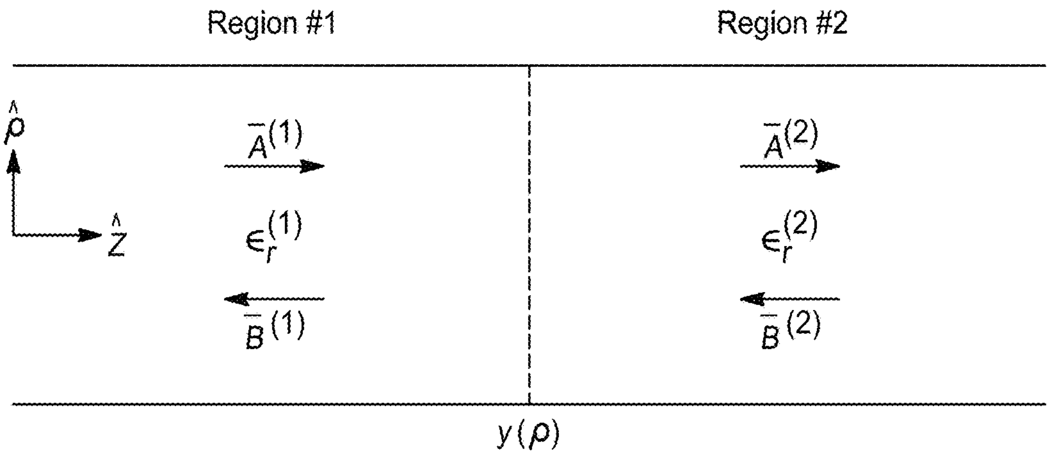
FIG. 5 shows a metasurface placed perpendicular to the waveguide axis of an over-molded cylindrical waveguide, where the metasurface comprises a single electric sheet with an inhomogeneous admittance profile $y(\rho)$.

First, one can see how the spatial boundary condition of a single electric sheet admittance can be transformed to the modal domain via numerical integration. Consider a single electric sheet admittance placed perpendicular to the 2 axis of a cylindrical waveguide, as shown in FIG. 5. It is described by an inhomogeneous admittance profile y(ρ). At this point, it is instructional to recall some cylindrical waveguide modal analysis. Recall, the azimuthally invariant TM fields in each region of the waveguide, shown in FIG. 5, can be expanded in terms of modes as follows, $$E_\rho^{(p)} = \sum_{n=1}^{\infty} \frac{\sqrt{\eta_n^{(p)}}}{u_n}\left(a_n^{(p)} e^{-ik_{zn}^{(p)}z} + b_n^{(p)} e^{ik_{zn}^{(p)}z}\right) J_1\left(\frac{j_n}{R}\rho\right) \quad (18)$$

$$H_\phi^{(p)} = \sum_{n=1}^{\infty} \frac{1}{u_n\sqrt{\eta_n^{(p)}}}\left(a_n^{(p)} e^{-ik_{zn}^{(p)}z} + b_n^{(p)} e^{ik_{zn}^{(p)}z}\right) J_1\left(\frac{j_n}{R}\rho\right), \quad (19)$$

where, $j_n$ is the nth null of $J_0(\bullet)$, and R is the waveguide radius, for the nth mode in region p, $a_n^{(p)}$ and $b_n^{(p)}$ denote the forward and backward modal coefficients, respectively $\eta_n^{(p)}$ $k_{zn}^{(p)}$ denote the TM modal wave impedance, and propagation constant, respectively. The TM modal wave impedance $\eta_n^{(p)}$ and the propagation constant $k_{zn}^{(p)}$ take the following form, $$\eta_n^{(p)} = \frac{k_{zn}^{(p)}}{\omega\epsilon_0\epsilon_r^{(p)}} \quad (20)$$

$$k_{zn}^{(p)} = \begin{cases} \sqrt{\omega^2\mu_0\epsilon_0\epsilon_r^{(p)} - \left(\frac{j_n}{R}\right)^2} & \text{for propagating modes} \\ -i\sqrt{\left(\frac{j_n}{R}\right)^2 - \omega^2\mu_0\epsilon_0\epsilon_r^{(p)}} & \text{for evanescent modes} \end{cases}. \quad (21)$$

The normalization factor is given by, $$u_n = \sqrt{\frac{J_1^2(j_n)R^2}{2}}. \quad (22)$$

Let one assume that the electric sheet is placed along the (z=0) plane. Using (5), one can rewrite the fields tangential to the metasurface in (18a) and (19) as, $$E_\rho^{(p)} = \sum_{n=1}^{\infty} \frac{\tilde{E}_n^{(p)}}{u_n} J_1\left(\frac{j_n}{R}\rho\right) \quad (23)$$

$$H_\phi^{(p)} = \sum_{n=1}^{\infty} \frac{\tilde{H}_n^{(p)}}{u_n} J_1\left(\frac{j_n}{R}\rho\right). \quad (24)$$

Considering only TM fields, the boundary condition (17) at the electric sheet admittance y(ρ), shown in FIG. 5 simplifies to, $$E_\rho = E_\rho^{(1)} = E_\rho^{(2)} \quad (25)$$

$$J_\rho^{8} = H_\phi^{(1)} - H_\phi^{(2)} = y(\rho)E\rho. \quad (25)$$

Substituting (23) and (24) into (26) and only retaining the first N modes, one can write, $$\sum_{n=1}^{N} \frac{\tilde{J}_n}{u_n} J_1\left(\frac{j_n}{R}\rho\right) = y(\rho)\sum_{n=1}^{N} \frac{\tilde{E}_n}{u_n} J_1\left(\frac{j_n}{R}\rho\right), \quad (27)$$

where $\tilde{J}_n$ is the modal coefficient of the surface current $\tilde{J}_\rho^{s}$, and $\tilde{E}_n$ is the modal coefficient of the electric field $E_\rho$. They are related to the modal coefficients of the fields in (23), and (24) as follows, $$\tilde{E}_n = \tilde{E}_n^{(1)} = \tilde{E}_n^{(2)} \quad (28)$$

$$\tilde{J}_n = \tilde{H}_n^{(1)} - \tilde{H}_n^{(2)} \quad (29)$$

Using the orthogonality of Bessel functions, $$\int_0^R J_1\left(\frac{j_n}{R}\rho\right) J_1\left(\frac{j_n}{R}\rho\right)\rho d\rho = \begin{cases} 0 & n \neq m \\ u_n^2 & n = m \end{cases}, \quad (30)$$

the surface current modal coefficients $\tilde{J}_n$, can be related to the electric field modal coefficients $\tilde{E}_n$ as follows, $$\tilde{J}_m = \sum_{n=1}^{N} \tilde{y}_{m,n}\tilde{E}_n. \quad (31)$$

In (31), $\tilde{y}_{m,n}$ is the modal mutual admittance that defines the ratio between the mth modal coefficient of the surface current $\tilde{J}_m$ and the nth modal coefficient of the electric field $\tilde{E}_n$. This mutual impedance $\tilde{y}_{m,n}$ is given by the following integral, $$\tilde{y}_{m,n} = \frac{\int_0^R y(\rho) J_1\left(\frac{j_n}{R}\rho\right) J_1\left(\frac{j_m}{R}\rho\right)\rho d\rho}{u_n u_m}. \quad (32)$$

Note that (31) can be written in matrix form as, $$\bar{\tilde{J}} = \tilde{Y}\bar{\tilde{E}} \quad (33)$$

where, $\bar{\tilde{J}} = [\tilde{J}_1 \ldots, \tilde{J}_N]^T$, $\bar{\tilde{E}} = [\tilde{E}_1 \ldots, \tilde{E}_N]^T$ and $\tilde{Y}_{(m,n)} = \tilde{y}_{(m,n)}$. From (32), it is apparent that in order to write (33), one need to evaluate at least $$\frac{N(N+1)}{2}$$

integrals to transform the metasurface boundary condition from the spatial domain to the modal domain. One can see that these integrals can be replaced by simple matrix multiplications using the DHT. This can significantly improve the computation efficiency of solving the metasurface in waveguide problems considered in this disclosure.

The Discrete Hankel Transform (DHT) is an accurate and simple tool to approximate the Hankel transform. In cylindrical waveguides, the Hankel transform is needed to calculate the modal coefficients of the fields. To illustrate this, consider the Bessel-Fourier expansion of the function f(ρ), that satisfies the condition f(ρ)=0, for ρ>R, $$f(\rho)=\sum_{n=1}^{\infty}\frac{\tilde{f}_n}{u_n}J_1\left(\frac{j_n}{R}\rho\right). \quad (34)$$

Note that, the expansion in (34) is the same as the modal field expansion of (23), and (24). The spectral (modal) coefficients $\tilde{f}_n$ are calculated by applying the Hankel transform to (34), and exploiting the Bessel functions orthogonality in (30), as follows, $$\tilde{f}_n=\frac{\int_0^R f(\rho)J_1\left(\frac{j_n}{R}\rho\right)\rho d\rho}{u_n}. \quad (35)$$

Applying the DHT will simplify the expression in (35), since the DHT uses matrix multiplication rather than numerical integration. As the name suggests, the DHT utilizes only discrete points in space. These discrete points in space are labeled $\rho_q$. The discrete points pa are sampled in terms of the tangential fields nulls ($J_1$ (•) nulls), $$\rho_q=\frac{\lambda_q}{\lambda_N}R, \quad (36)$$

where, $\lambda_i$ is the ith null of the function $J_1$(•). The function values at theses points $f(\rho_q)$ are related to the modal coefficients $\tilde{f}_n$ by the transformation matrices as, $$\tilde{\bar{f}}=\bar{\bar{T}}_f\bar{f} \quad (37)$$

$$\bar{f}=\bar{\bar{T}}_i\tilde{\bar{f}} \quad (38)$$

where, $\bar{f}=[f(\rho_1), f(\rho_N)]^T$, $\tilde{\bar{f}}=[\tilde{f}_1 \ldots, \tilde{f}_N)]^T$, $\bar{\bar{T}}^f$ and $\bar{\bar{T}}_j$ are the forward and inverse transformation matrices, respectively. The transformation matrices are known in closed-form and given by, $$\bar{\bar{T}}_f(n,q)=2\left(\frac{R}{\lambda_N J_0(\lambda_q)}\right)^2\frac{J_1\left(\frac{j_n\lambda_q}{\lambda_N}\right)}{u_n} \quad (39)$$

$$\bar{\bar{T}}_i(q,n)=\frac{J_1\left(\frac{j_n\lambda_q}{\lambda_N}\right)}{u_n} \quad (40)$$

On the left side of the above two equations, the numbers between the parenthesis indicate the element index in the matrix. The transformation matrices satisfy the following relation, $$\bar{\bar{T}}_i\bar{\bar{T}}_f\bar{\bar{L}}=I \quad (41)$$

$$\bar{\bar{T}}_f\bar{\bar{L}}\bar{\bar{T}}_i=I \quad (42)$$

where, I is the identity matrix, and $\bar{\bar{L}}$ is a diagonal matrix with all entries equal to one except for the last entry, as follows, $$\bar{\bar{L}}=\begin{bmatrix}1 & \ldots & 0\\ \vdots & \ddots & \vdots\\ 0 & \ldots & \frac{1}{2}\end{bmatrix} \quad (43)$$

To derive the modal representation of the metasurface, shown in FIG. 5, using the DHT, let's first discretize the sheet boundary condition in (26). The boundary condition (26) is discretized at the points specified by (36). Therefore, one can write $$\bar{J}=\bar{\bar{Y}}\bar{E}, \quad (44)$$

where, $\bar{J}=[J_\rho^{\,s}(\rho_q)\ldots, J_\rho^{\,s}(\rho_N)]^T$, $\bar{E}=[E_\rho(\rho_q)\ldots, E_\rho(\rho_N)]^T$, and $\bar{\bar{Y}}$ is a diagonal matrix of the form, $$\bar{\bar{Y}}_n=\begin{bmatrix}y(\rho_1) & \ldots & 0\\ \vdots & \ddots & \vdots\\ 0 & \ldots & y_n(\rho_N)\end{bmatrix}. \quad (45)$$

Note that the vectors $\bar{J}$, and $\bar{E}$ in (44) are related to the vectors $\tilde{\bar{J}}$, and $\tilde{\bar{E}}$ in (33), by the transformation matrices (37), and (38). So, (44) can be rewritten as, $$\bar{\bar{T}}_i\tilde{\bar{J}}=\bar{\bar{Y}}\bar{\bar{T}}_i\tilde{\bar{e}}, \quad (46)$$

Using (42), (46) can be rewritten as, $$\tilde{\bar{J}}=\bar{\bar{T}}_f\bar{\bar{L}}\bar{\bar{Y}}\bar{\bar{T}}_i\tilde{\bar{E}}. \quad (47)$$

Comparing (47), and (33), we deduce that $\tilde{Y}$ can be written in closed-form as, $$\tilde{\bar{\bar{Y}}}=\bar{\bar{T}}_f\bar{\bar{L}}\bar{\bar{Y}}\bar{\bar{T}}_i. \quad (48)$$

It should be pointed out that the DHT form of the modal representation of the admittance sheet $\tilde{Y}$ in (48) does not require any numerical integration. This is in contrast to (33) which requires at least $$\frac{N(N+1)}{2}$$

integrals. Therefore, the DHT form of the modal representation of the metasurface is more efficient in the analysis and the synthesis of metasurfaces within cylindrical waveguides.

As seen above, the boundary condition of a single electric sheet admittance $y(\rho)$ can be efficiently transformed from the spatial domain to modal domain $\tilde{Y}$ using the DHT. In this section, the goal is to use the modal representation of a single electric sheet admittance $\tilde{Y}$, derived using the DHT (48), to obtain the modal matrices of the metasurface consisting of cascaded electric sheets. Although, the metasurface shown in FIG. 6 comprises four electric sheets, the derivation is applicable to an arbitrary number of electric sheets. First, the modal matrices of the individual electric sheets of the metasurface are derived. Then, the modal matrices of the cascaded sheet comprising the metasurface are derived.

Figure 6:
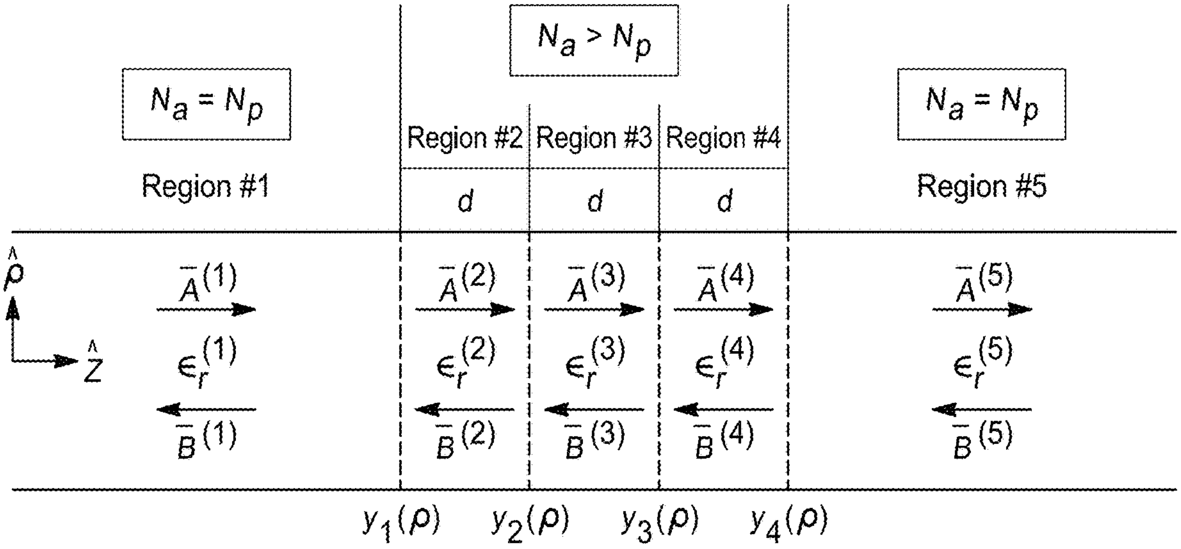
FIG. 6 shows a metasurface consisting of cascaded electric sheets placed perpendicular to the propagation axis within an over-molded cylindrical waveguide; the metasurface comprises four electric sheets described by inhomogeneous admittance profiles yn $(\rho)$ and the sheets are separated by dielectric spacers of thickness d.

Consider the electric sheet admittance $y_n(\rho)$, where the subscript n denotes one of electric sheets comprising the metasurface shown in FIG. 6. Using (48), the modal representation $\tilde{Y}_n$ of the isotropic electric sheet admittance $y_n(\rho)$ can be written as, $$\tilde{\bar{\bar{Y}}}_n=\bar{\bar{T}}_f\bar{\bar{L}}\bar{\bar{Y}}_n\bar{\bar{T}}_i \quad (49)$$

where, the $\tilde{Y}_n$ is given by, $$\bar{\bar{Y}}_n=\begin{bmatrix}y_n(\rho_1) & \ldots & 0\\ \vdots & \ddots & \vdots\\ 0 & \ldots & y_n(\rho_N)\end{bmatrix}. \quad (50)$$

At the electric sheet $y_n(\rho)$, the modal coefficients of the surface current $\bar{\tilde{J}}^{(n)}$ can be related to the modal coefficients f of the electric field $\bar{\tilde{E}}^{(n)}$ using (49) as follows, $$\bar{\tilde{J}}^{(n)}=\tilde{Y}_n\bar{\tilde{E}}^{(n)} \quad (51)$$

Substituting (29) in (51), yields $$\bar{\tilde{H}}^{(n)}-\bar{\tilde{H}}^{(n+1)}=\tilde{Y}_n\bar{\tilde{E}}^{(n)} \quad (52)$$

Given that the tangential electric field is continuous across the electric sheet admittance (25), one can write $$\bar{\tilde{E}}^{(n)}=\bar{\tilde{E}}^{(n+1)} \quad (53)$$

The equations (52), and (53) can be rewritten in matrix form as, $$\begin{bmatrix} \tilde{E}^{(n)} \\ \tilde{H}^{(n)} \end{bmatrix} = \begin{bmatrix} I & 0 \\ \tilde{Y}_n & I \end{bmatrix} \begin{bmatrix} \tilde{E}^{(n+1)} \\ \tilde{H}^{(n+1)} \end{bmatrix}. \quad (54)$$

Comparing (54) to (7), one can see the modal ABCD matrix of the electric sheet admittance $y_n(\rho)$ is, $$(ABCD)_{y_n(\rho)} = \begin{bmatrix} I & 0 \\ \tilde{Y}_n & I \end{bmatrix}. \quad (55)$$

The modal wave matrix $(M)_{yn}(p)$ of the electric sheet admittance $y_n(\rho)$, can be obtained by applying (9) to (55). Such that $$(M)_{y_n(\rho)} = \frac{1}{2}\begin{bmatrix} V+(V)^{-1}+Q & V-(V)^{-1}+Q \\ V-(V)^{-1}-Q & V+(V)^{-1}-Q \end{bmatrix}, \quad (56)$$

where, $V=(g^{(n)})^{-1}g^{(n+1)}$, and $Q=g^{(n)}\tilde{Y}_n g^{(n+1)}$. Also, the modal scattering matrix $(S)_{yn(\rho)}$ of the electric sheet admittance $y_n(\rho)$, can be obtained from $(M)_{yn(\rho)}$, by using (12). The reduced modal scattering matrix (S) $y_n(\rho)$ of the electric sheet admittance $y_n(\rho)$, can be obtained from $(S)_{yn(\rho)}$ by using (16). In all these network representations (matrices), the reference plane of the ports (modes) is chosen to be at the plane of the electric sheet.

As was explained earlier, an evanescent mode in the reduced modal scattering matrix $(S)'_{yn(\rho)}$ can be regarded as an accessible mode, if the decay length of the mode is comparable to the separation distance, d, between the sheets. Therefore, the number of accessible modes $N_a$ for the individual electric sheets in the metasurface is typically larger than the number of the propagating modes $N_p$.

The modal wave matrix of a metasurface consisting of cascaded electric sheets $(M)_{MS}$ is simply obtained by multiplying the modal wave matrices of the individual electric admittance sheets and the dielectric spacers between them [10]. Since inaccessible modes do not interact with adjacent sheets, the reduced modal wave matrices of the sheets $(M)'_{yn(\rho)}$ should be used instead of the original modal wave matrices of the sheets $(M)_{yn(\rho)}$. The reduced modal wave matrix of an electric sheet $(M)'_{yn(\rho)}$ is obtained from its reduced modal scattering matrix $(S)'_{yn(\rho)}$ by using (13). The modal wave matrix of a dielectric spacer $(M)_d^{(n)}$ in region η with thickness d, takes the following form, $$(M)_d^{(n)} = \begin{bmatrix} \begin{bmatrix} e^{ik_{z1}^{(n)}} & \dots & 0 \\ \vdots & \ddots & \vdots \\ 0 & \dots & e^{ik_{zN_a}^{(n)}} \end{bmatrix} & 0 \\ 0 & \begin{bmatrix} e^{-ik_{z1}^{(n)}} & \dots & 0 \\ \vdots & \ddots & \vdots \\ 0 & \dots & e^{-ik_{zN_a}^{(n)}} \end{bmatrix} \end{bmatrix}. \quad (57)$$

Now, one can write the modal wave matrix of the cascaded sheet metasurface shown in FIG. 6, as follows, $$(M)_{MS}=(M)'_{y1(\rho)}(M)_D^{(2)}(M)'_{y2(\rho)} \dots (M)_d^{(4)}(M)'_{y4(\rho)} \quad (58)$$

To obtain the modal scattering matrix $(S)_{MS}$ from $(M)_{MS}$, use relation (12). Note that, since the metasurface consisting of cascaded electric sheets is isolated in the waveguide, the number of the accessible modes for the overall metasurface $N_a$ is equal to the number of the propagating modes Np. Using (16), one can derive the unitary modal scattering matrix $(S)^U_{MS}$ that only considers propagating modes.

In summary, the metasurface modal representation $\tilde{Y}$, derived by the DHT, was used to find the modal wave matrices $(M)_{yn(\rho)}$ of the individual electric sheets comprising the metasurface. Then, the reduced modal wave matrix $(M)'_{yn(\rho)}$ is derived by terminating the inaccessible modes. Next, the metasurface modal wave matrix $(M)_{MS}$ is constructed by multiplying the reduced modal wave matrices $(M)'_{yn(\rho)}$ of the individual sheets and the modal wave matrices of the dielectric spacers $(M)^{(n)}_d$. All the evanescent modes in $(M)_{MS}$ are terminated in modal characteristic impedances to derive the unitary modal scattering matrix $(S)^U_{MS}$. This matrix will be used to synthesize a metasurface-based mode converting devices.

Fields within a waveguide are uniquely determined by their modal distribution. Therefore, mode conversion in a waveguide is equivalent to field transformation. As a result, mode conversion can be of great use in antenna design, specifically antenna aperture synthesis. The metasurface-based mode converting devices proposed here are low profile, lossless, and passive devices that are designed to convert a set of incident $TM_{0n}$ modes to a desired set of $TM_{0n}$ reflected/transmitted modes within an overmoded cylindrical waveguide. Inspired by metasurface-based polarization converters, the metasurface-based mode converting device is synthesized using the cascaded electric sheet model of a metasurface. The number of the electric sheets in the metasurface is dictated by the mode converting device specifications. In the examples presented here, the metasurface comprises four electric sheets, (see FIG. 2 and FIG. 6). The number of sheets can vary depending on the bandwidth requirements and number of incident and transmitted/reflected modes that are specified.

The metasurface-based mode converting device is synthesized using optimization. In the synthesis process, the admittances profiles of the electric sheets are optimized to meet performance targets: realize targeted entries of the desired metasurface's unitary modal scattering matrix $(S)^U_{MS}$. In other words, the metasurface is designed to convert incident modes to desired reflected/transmitted modes. In each iteration of the optimization routine, the metasurface's unitary modal scattering matrix $(S)^U_{MS}$ is computed by following the procedure described above. The optimization of the metasurface is rapid due to the fast computation of metasurface's response within each iteration, enabled by modal network theory and the DHT. The sheet profiles are assumed to be purely imaginary functions to ensure that the metasurface is lossless and passive. Moreover, each sheet profile is assumed to consist of capacitive, concentric annuli here, which can be easily realized as printed metallic rings. The number of concentric annuli per sheet is dictated by the mode converting device specifications.

Figure 12:
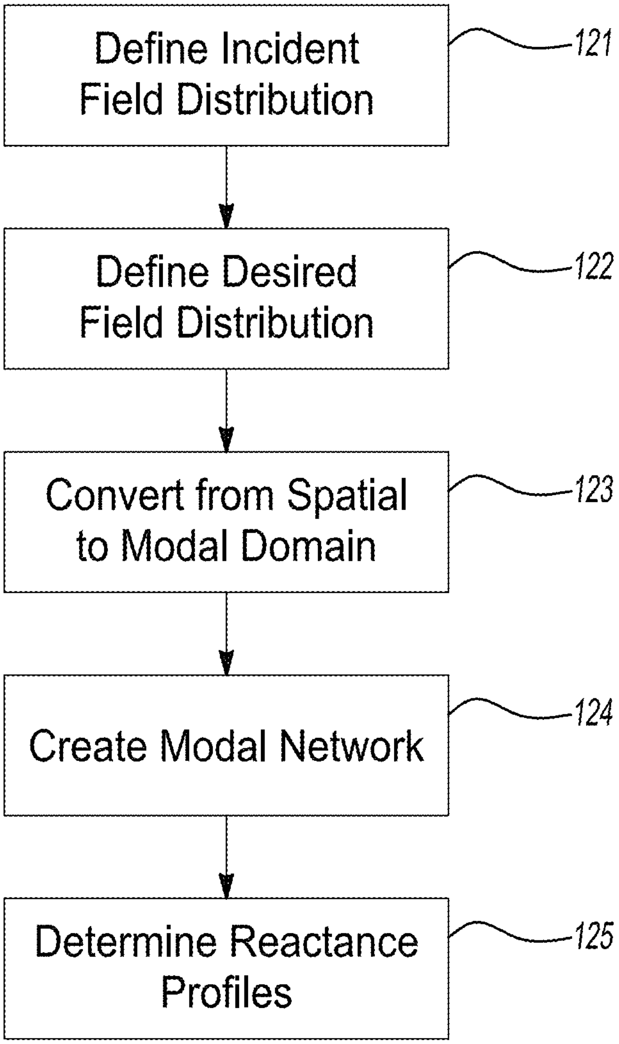
FIG. 12 is a flowchart providing an overview of a computer-implemented method for designing a mode converting device.

FIG. 12 provides an overview of the design technique described above for a mode converting device. The mode converting device has a metasurface comprised of multiple reactance sheets, where the reactance sheets are arranged transverse to a longitudinal axis of a waveguide and parallel to each other.

An incident spatial field distribution of the electromagnetic field incident on the metasurface of the mode converting device is defined at 121, where the incident spatial field distribution of the electromagnetic field is defined in spatial domain. Likewise, a desired spatial field distribution of the electromagnetic field exiting the metasurface of the mode converting device is defined at 122, where the desired spatial field distribution of the electromagnetic field is defined in spatial domain.

Next, the incident spatial field distribution of the electromagnetic field and the desired spatial field distribution of the electromagnetic field are converted at 123 from the spatial domain to a modal domain. In one example, the spatial field distributions of the electromagnetic fields are converted using a discrete Hankel transform although other transform techniques are contemplated by this disclosure.

Modal microwave network theory is then used to relate the input set of modes to those at the output through simple matrix operations as indicated at 124. Each reactance sheet of the metasurface, as well as the spacings between the sheets, are described with modal networks. The modal networks of the reactance sheets and spacers are then cascaded together to find the overall modal network of the metasurface. The overall modal network relates the input set of the modes to the output set of modes. Ports of the modal network represent input or output guided modes on both sides of a reactance sheet. Modal network theory accounts for the multiple reflections between sheets and the coupling of modes at the surfaces of the inhomogeneous (spatially-varying) reactance sheets.

Lastly, reactance profiles for each reactance sheet are determined at 125 through an optimization of the modal network. For example, a standard optimization routine, such as interior-point algorithm within the Matlab functions may be employed. The optimized reactance sheets are then realized, for example as metallic patterned features. These patterned features are designed through fullwave electromagnetic scattering simulations.

Figure 7A:
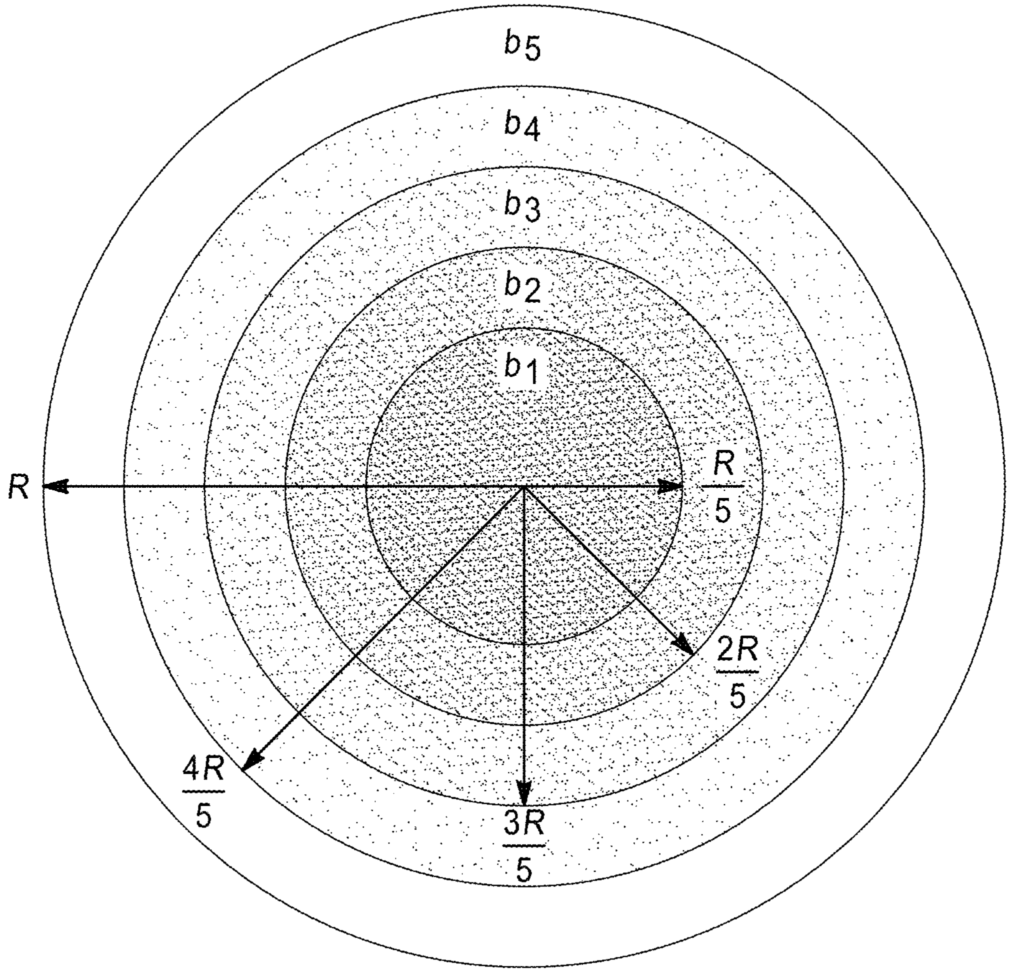
FIG. 7A shows the discretized susceptance profile for an electric sheet, where the single sheet is discretized into five concentric, purely capacitive annuli.

To illustrate the design process, two design examples at 10 GHz are outlined below. A single mode converting device is shown, as well as a mode splitter. The single mode converting device transforms an incident $TM_{01}$ mode to a $TM_{02}$ mode with 45° transmission phase. The mode splitter evenly splits an incident $TM_{01}$ mode between $TM_{10}$ and $TM_{02}$ modes with 45° transmission phase for both modes. In both examples, an air-filled waveguide is considered. The waveguide radius was chosen to be R=40 mm=1.33λ. Both mode converting devices were synthesized using a metasurface comprising four electric sheets separated by freespace. The separation distance between the sheets was set to, d=0.2λ for the single mode converting device, and d=0.1λ for the mode splitter. Each electric sheet of the metasurface is a lossless, passive electric sheet admittance. Therefore, it can be represented by a radially varying susceptance, $$y(\rho)=ib(\rho) \tag{59}$$

where, b(ρ) is a real-valued function. The electric sheets are uniformly segmented into five capacitive concentric annuli, as shown in FIG. 7A. Thus, the susceptance profile of each sheet b(ρ) can be written as a piece-wise function, $$b(\rho)=\begin{cases} b_1 & 0<\rho<\frac{R}{5} \\ b_2 & \frac{R}{5}<\rho<\frac{2R}{5} \\ \vdots & \\ b_5 & \frac{4R}{5}<\rho<R, \end{cases} \tag{60}$$

where, $b_1$ to $b_5$ are all real positive numbers. Based on the waveguide radius, only the $TM_{01}$ and $TM_{02}$ modes are propagating. Consequently, the unitary modal scattering matrix of the metasurface $(S)^U_{MS}$ is a 4×4 square matrix. According to (10), (11), and FIG. 2, it takes the following form, $$(S)^u_{MS}=\begin{bmatrix} \begin{bmatrix} S_{11}^{(1,1)} & S_{11}^{(1,2)} \\ S_{11}^{(2,1)} & S_{11}^{(2,2)} \end{bmatrix} & \begin{bmatrix} S_{12}^{(1,1)} & S_{12}^{(1,2)} \\ S_{12}^{(2,1)} & S_{12}^{(2,2)} \end{bmatrix} \\ \begin{bmatrix} S_{21}^{(1,1)} & S_{21}^{(1,2)} \\ S_{21}^{(2,1)} & S_{21}^{(2,2)} \end{bmatrix} & \begin{bmatrix} S_{22}^{(1,1)} & S_{22}^{(1,2)} \\ S_{22}^{(2,1)} & S_{22}^{(2,2)} \end{bmatrix} \end{bmatrix}. \tag{61}$$

Figure 7B:
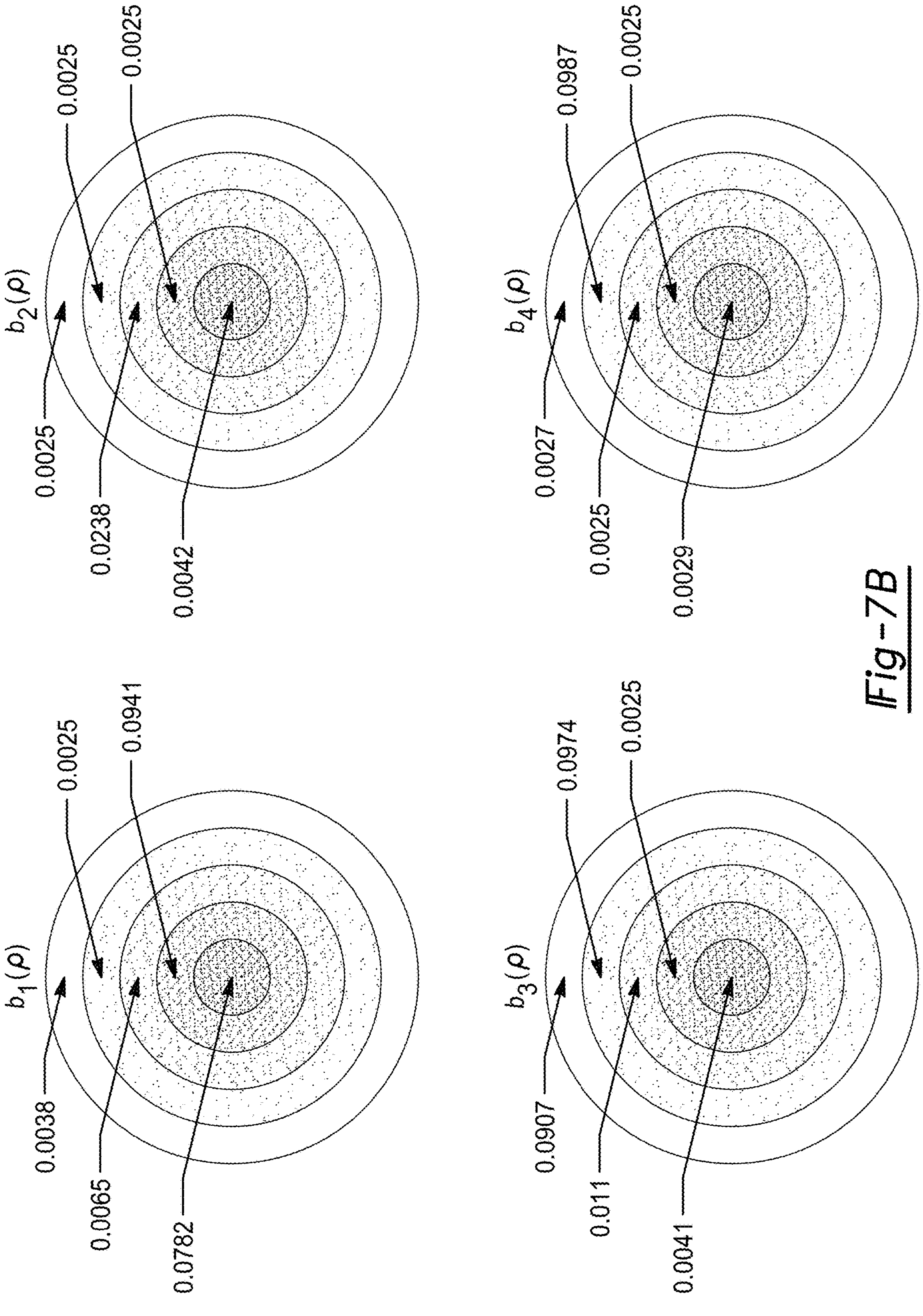
FIG. 7B shows the susceptance profiles for sheets comprising a single mode converting device.
Figure 7C:
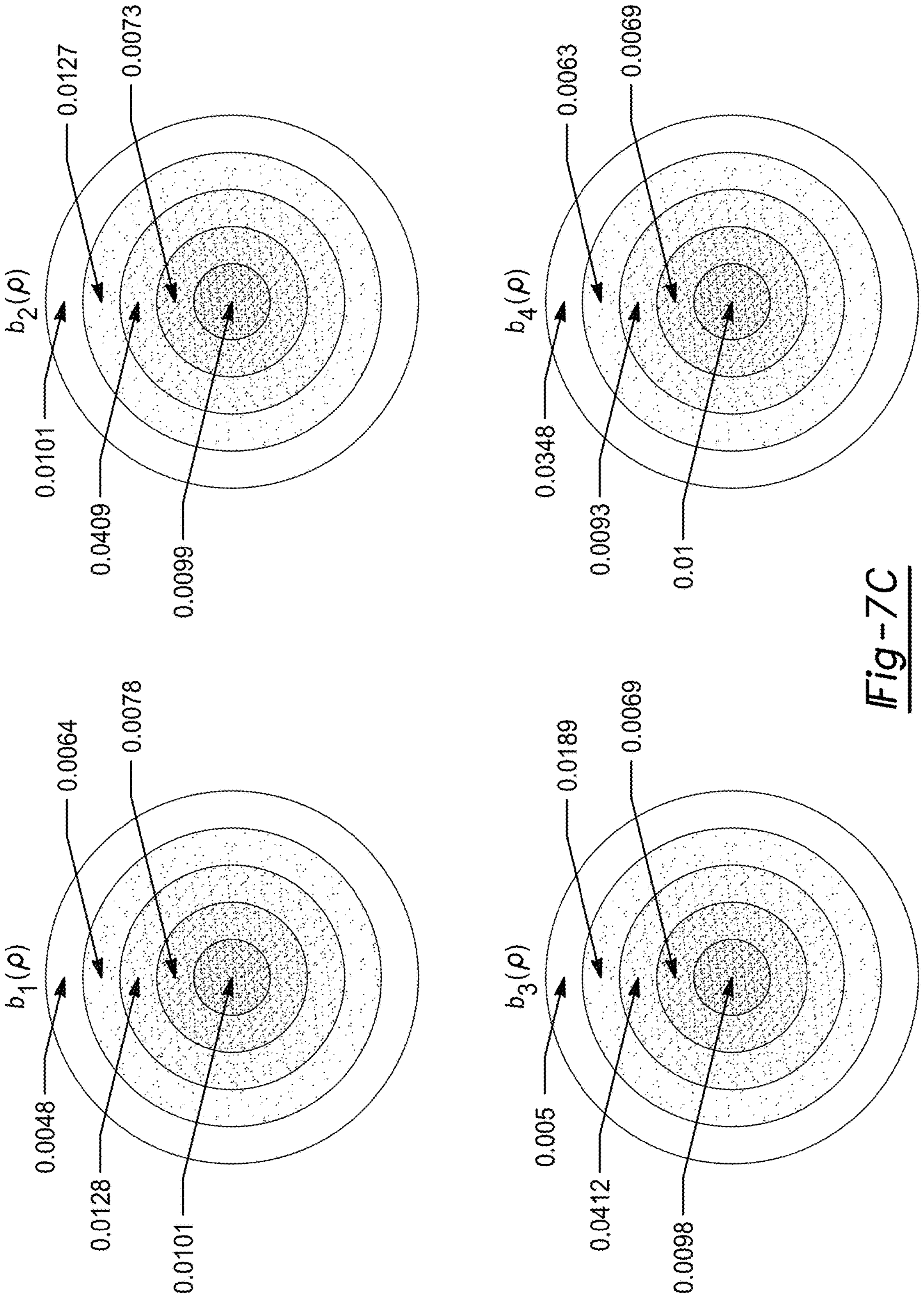
FIG. 7C shows the susceptance profiles for sheets comprising a mode splitter.
Figure 8A:
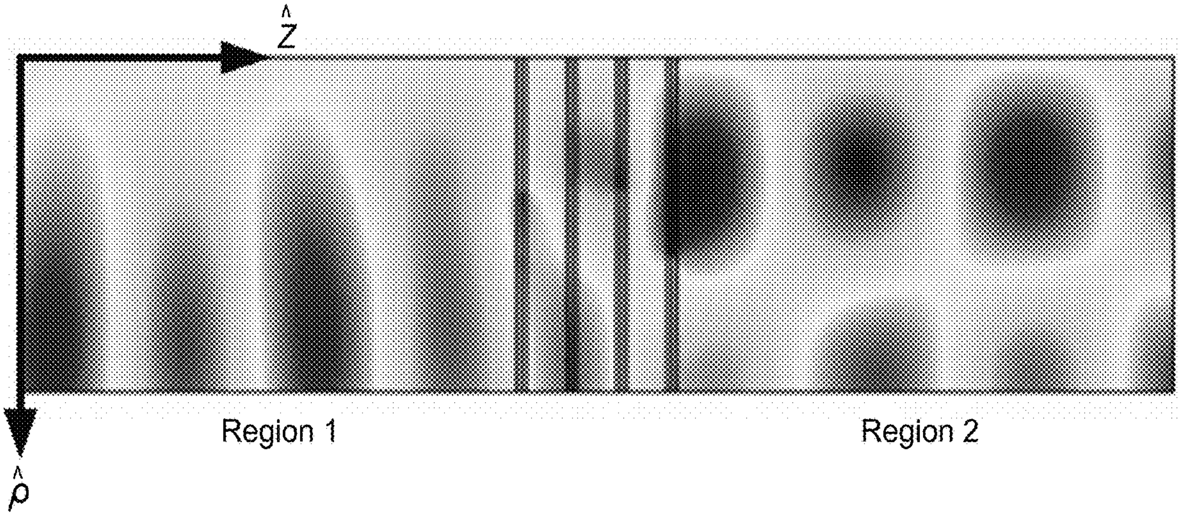
FIGS. 8A and 8B are 2D surface plots of the real part of the electric field phasor (instantaneous electric field) for the single mode converting device and for the mode splitter, respectively.
Figure 8B:
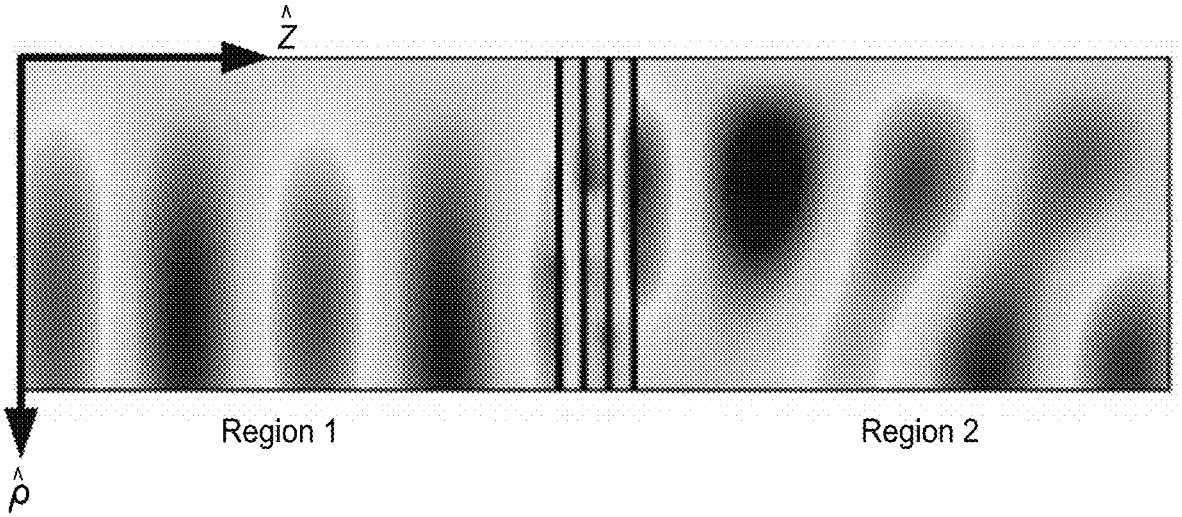
Figure 9A:
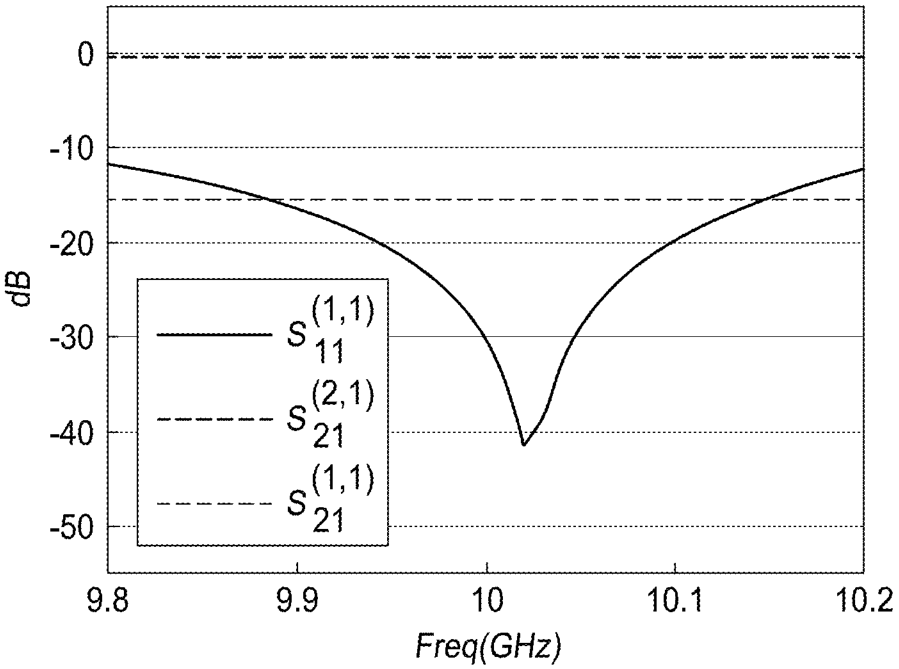
FIGS. 9A and 9B are graphs showing the scattering parameters of the single mode converting device and the mode splitter, respectively, as function of frequency, calculated using ANSYS-HFSS.
Figure 9B:
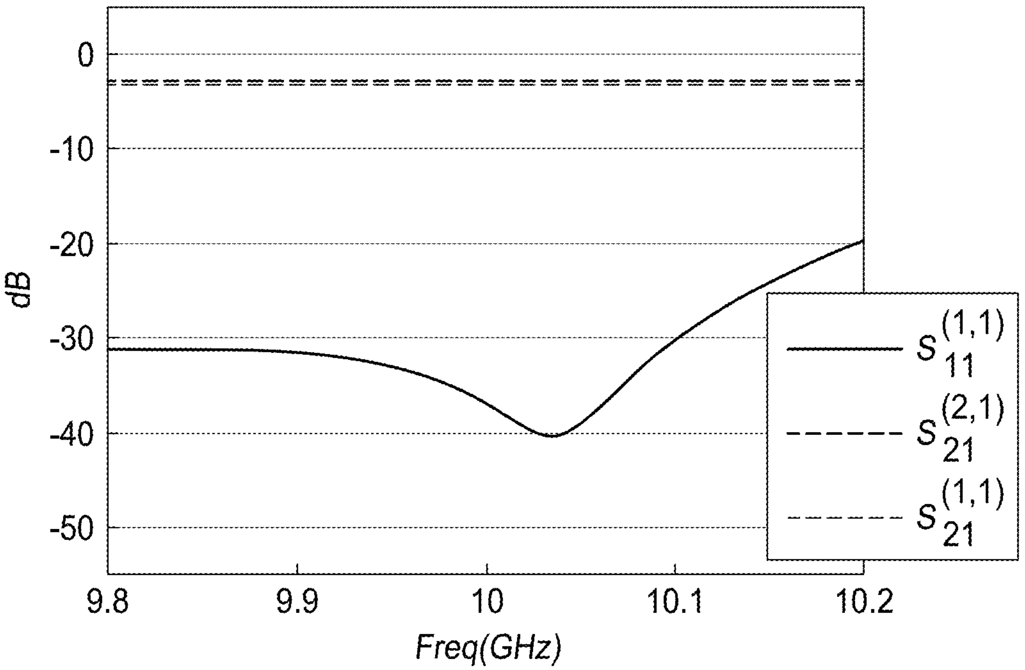

The optimization cost functions to be minimized for the single mode converting device, $F_1$, and the mode sputter, $F_2$, can be defined as, $$F_1=\|S_{21}^{(2,1)}-1\angle-45°\| \tag{62}$$

$$F_2=\left\|\left[S_{21}^{(1,1)}\ \ S_{21}^{(2,1)}\right]-\frac{1}{\sqrt{2}}\left[\angle-45°\ \ \angle-45°\right]\right\|, \tag{63}$$

where, $S^{(2,1)}$, and $S^{(1,1)}$ are entries of the unitary modal scattering matrix of the metasurface $(S)_{MS}$, as defined in (61). Using the interior-point algorithm within the built-in Matlab function fmincon, the susceptance profiles of the sheets were optimized to minimize the objective functions $F_1$ and $F_2$. The optimal susceptance profiles of the sheets are shown in FIG. 7B, and FIG. 7C for the single mode converting device and the mode splitter, respectively. The optimization results were verified using the commercial fullwave solvers COMSOL Multiphysics and ANSYS-HFSS. For the single mode converting device, 2D surface $plot_{11}$ of the electric field computed using COMSOL Multiphysics (see FIG. 8A) shows that the incident $TM_{01}$ mode in region 1 is converted to $TM_{02}$ mode in region 2. For the mode splitter, a 2D surface plot of the electric field computed by COMSOL Multiphysics (see FIG. 8B) shows that the incident $TM_{01}$ mode in region 1 was evenly split between a $TM_{01}$ mode and a $TM_{02}$ mode in region 2. The scattering parameters of the single mode converting device design, $S^{(2,1)}$ (transmission from $TM_{01}$ mode in region 1 to $TM_{02}$ mode in region 2), $S^{(1,1)}$ (transmission from $TM_{01}$ mode in region 1 to $TM_{01}$ mode in region 2), and $S^{(1,1)}$ (reflection of $TM_{01}$ mode in region 1 into $TM_{01}$ mode in region 1) are shown in FIG. 9A as function of frequency calculated using ANSYS-HFSS. The results show that there is almost zero reflection of the incident $TM_{01}$ mode in region 1 at the design frequency 10 GHz. In addition, it shows full transmission for the desired mode ($TM_{02}$) in region 2, and no transmission for the undesired mode ($TM_{01}$). In FIG. 9B, the scattering parameters of the mode splitter design are shown as function of frequency calculated using ANSYS-HFSS. The results again show that there is almost zero reflection of the incident $TM_{01}$ mode in region 1 at the design frequency 10 GHz. Also, it shows an even split of the incident power in region 2 between $TM_{01}$ and $TM_{02}$ modes. In both FIG. 6(*c*) and FIG. 6(*d*), we assumed that the sheets' susceptances vary with the frequency as those of a capacitance.

Figure 10:
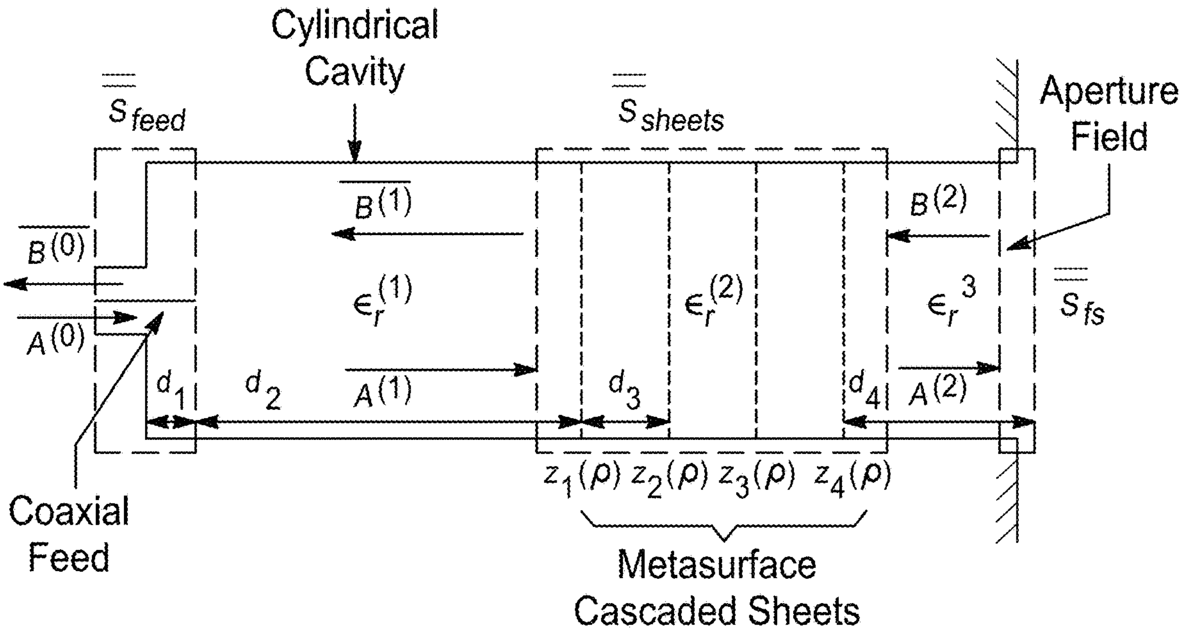
FIG. 10 is a side view of an example embodiment of a cylindrical antenna.

As noted above, designing an antenna is one application for metasurface-based mode converting devices. An example of a metasurface antenna with three multiport networks is shown in FIG. 10. The first network represents the feed (the coax to waveguide junction). It is described by the modal scattering matrix $\overline{\overline{S}}_{feed}$. The feed's modal scattering matrix can be calculated using the mode matching technique. Here, the commercial electromagnetic simulator ANSYS HFSS was used to calculate it for convenience. The second network, labeled $\overline{\overline{S}}_{sheets}$, represents the metasurface consisting of cascaded, inhomogeneous electric sheets. The metasurface modal scattering matrix is calculated from the analytical modal wave matrix of the metasurface. The last network represents the free space interface $\overline{\overline{S}}_{fs}$. The modal reflection matrix at the interface can be calculated using the free space Green's function. The following three equations show the relation between the incident and reflected modes of each network (see FIG. 10), $$\begin{bmatrix} \overline{B^{(0)}} \\ \overline{A^{(1)}} \end{bmatrix} = \overline{\overline{S}}_{feed} \begin{bmatrix} \overline{A^{(0)}} \\ \overline{B^{(1)}} \end{bmatrix} \quad (1)$$

$$\begin{bmatrix} \overline{B^{(1)}} \\ \overline{A^{(2)}} \end{bmatrix} = \overline{\overline{S}}_{sheets} \begin{bmatrix} \overline{A^{(1)}} \\ \overline{B^{(2)}} \end{bmatrix} \quad (2)$$

$$[\overline{B^{(2)}}] = \overline{\overline{S}}_{fs}[\overline{A^{(2)}}] \quad (3)$$

From (3), the modal coefficients of the aperture can be written as, $$\tilde{E}_\rho = (\overline{\overline{g^{(2)}}})(\bar{I} - \overline{\overline{S}}_{fs})\overline{A^{(2)}} \quad (4)$$

where, $\bar{I}$ is the identity matrix, $\overline{\overline{g^{(2)}}}$ is a diagonal matrix contains the square root of the TM wave impedances of the modes. By substituting (3) and (2) into (1), $\overline{A^{(2)}}$ can be found.

Figure 11A:
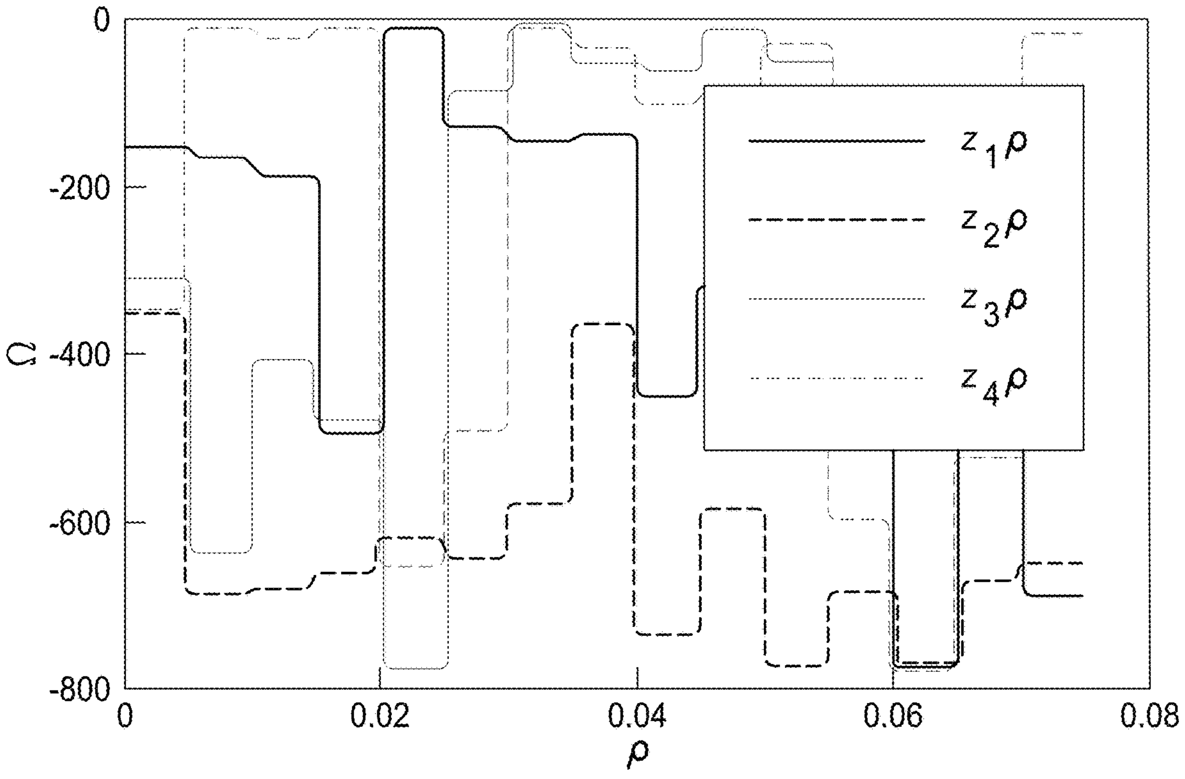
FIG. 11A shows the reactance profiles of the four (metasurfaces) electric sheets as a function of radial distance.
Figure 11B:
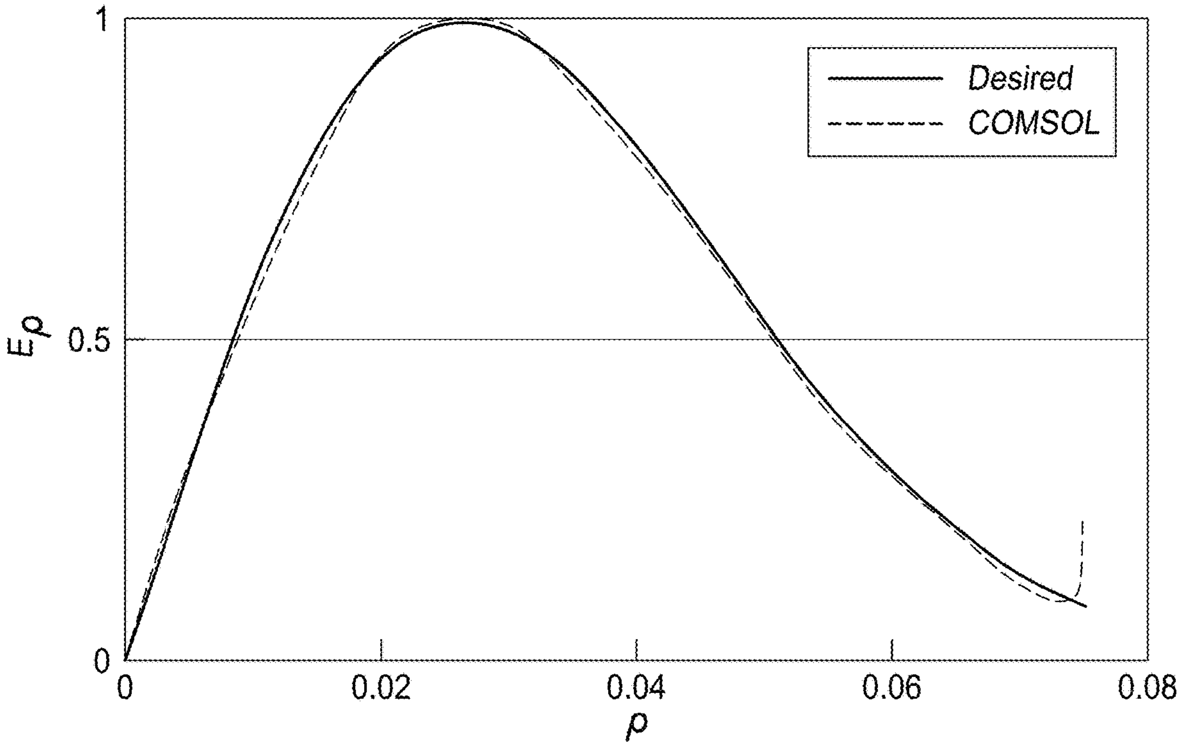
FIG. 11B is a graph showing the desired and simulated aperture field profiles.

Next, the modal coefficients of the desired aperture (radial Gaussian beam aperture shown in FIG. 11B, $\tilde{E}_q^{decired}$, are computed. Using Matlab's built-in optimization toolbox, the sheets are optimized to minimize the following cost function, $$F = \left\| (\overline{\overline{g^{(2)}}})(\bar{I} - \overline{\overline{S}}_{fs})\overline{A^{(2)}} - \tilde{E}_\rho^{desired} \right\|^2 \quad (5)$$

The Gaussian beam metasurface antenna is designed at 10 GHz. The antenna radius is chosen to be R=2.5λ, and the Gaussian beam waist is set to w=–$^R$. Referring to FIG. 1, the dimensions are [$d_1$ $d_2$ $d_3$ $d_4$]=[3.429 2.921 1.524 6.35] (mm). The dielectric constants are chosen to be $\epsilon_r^{(1)}=\epsilon_r^{(3)}=1.07$, and $\epsilon_r^{(2)}=3$.

The reactance profiles of the electric sheets comprising the metasurface are plotted as a function of ρ in FIG. 11A. Since the sheets are lossless, the real part of the impedance profiles (resistance) is zero. The desired radial Gaussian aperture field, along with the full wave simulation results from COMSOL, are shown in FIG. 11B. Close agreement is shown between the desired aperture and that simulated for the designed metasurface antenna. It should be mentioned that the reflection coefficient at the feed is lower than −20 dB.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A mode converting device, comprising:
- a waveguide supporting electromagnetic fields therein and defining a longitudinal axis; and
- multiple electric sheets associated with the waveguide and configured to interact with the electromagnetic fields incident thereon, wherein the electromagnetic fields comprising a set of modes and the multiple electric sheets operate to change at least one mode of the electromagnetic fields,
- wherein each of the multiple electric sheets is arranged transverse to longitudinal axis of the waveguide and parallel to each other;
- wherein each of the multiple electric sheets includes patterned features, such that dimensions of the patterned features are less than wavelength of the electromagnetic fields; and
- wherein spacing between each of the multiple electric sheets is less than or on the order of the wavelength of the electromagnetic fields.

2. The mode converting device of claim 1 wherein spacing between patterned features varies across each of the multiple electric sheets.

3. The mode converting device of claim 1 wherein the multiple electric sheets are enclosed within the waveguide.

4. The mode converting device of claim 1 wherein the multiple electric sheets are disposed on an exterior surface of the waveguide, such that the electromagnetic fields penetrate through the multiple electric sheets and radiate therefrom.

5. The mode converting device of claim 1 wherein the patterned features are comprised of metal.

6. The mode converting device of claim 1 wherein the patterned features are comprised of dielectric.

7. The mode converting device of claim 1 wherein each of the multiple electric sheets are in shape of a disk and the patterned features are further defined as a series of concentric rings.

8. The mode converting device of claim 1 wherein each of the multiple electric sheets are in shape of a disk and the patterned features are further defined as spatially varying.

9. The mode converting device of claim 1 wherein each of the multiple electric sheets are in shape of a rectangle.

10. The mode converting device of claim 1 wherein the patterned feature is further defined as rectangles non-uniformly distributed.

11. The mode converting device of claim 1 wherein the patterned feature is further defined as rectangles non-uniformly distributed.

12. The method of claim 1 further comprises converting the incident electromagnetic field and the desired electromagnetic field from the spatial domain to the modal domain using a discrete Fourier transform.

13. The method of claim 1 wherein relating the incident electromagnetic fields in the modal domain via a modal network to the desired electromagnetic fields in the modal domain further comprises
- for each reactance sheet, representing guided modes of the electromagnetic fields on both sides of a given reactance sheet as ports of a modal network; and
- cascading the modal network for each reactance sheet together to create an overall modal network for the metasurface.

14. The method of claim 1 wherein the modal network accounts for multiple reflections between reactance sheets and the coupling of modes at the surfaces of the reactance sheets.

15. The method of claim 1 further comprise implementing the reactance profiles of a reactance sheet using patterned features, such that dimension of the pattern features are less than wavelength of the electromagnetic fields.

16. The method of claim 15 further comprises determining the patterned features using fullwave electromagnetic scattering simulations.

17. A mode converting device, comprising:
- a waveguide supporting electromagnetic fields therein and defining a longitudinal axis; and
- multiple electric sheets associated with the waveguide and configured to interact with the electromagnetic fields incident thereon, wherein each of the multiple electric sheets is arranged transverse to the longitudinal axis and parallel to each other;
- wherein each of the multiple electric sheets includes patterned features, such that dimensions of the patterned features are less than wavelength of the electromagnetic fields; and
- wherein spacing between each of the multiple electric sheets is configured to allow coupling between the multiple electric sheets through the propagating spectrum and the evanescent spectrum.

18. The mode converting device of claim 17 wherein spacing between patterned features varies across each of the multiple electric sheets.

19. The mode converting device of claim 17 wherein the multiple electric sheets are enclosed within the waveguide.

20. The mode converting device of claim 17 wherein the multiple electric sheets are disposed on an exterior surface of the waveguide, such that the electromagnetic fields penetrate the multiple electric sheets and radiate therefrom.

21. The mode converting device of claim 17 wherein each of the multiple electric sheets are in shape of a disk and the patterned features are further defined as a series of concentric rings.

22. The mode converting device of claim 17 wherein each of the multiple electric sheets are in shape of a disk and the patterned features are further defined as spatially varying.

23. The mode converting device of claim 17 wherein each of the multiple electric sheets are in shape of a rectangle.

24. A computer-implemented method for designing a mode converting device, comprising:

defining a mode converting device having a metasurface comprised of multiple reactance electric sheets, where the reactance sheets are arranged transverse to a longitudinal axis of a waveguide and parallel to each other;

defining an incident electromagnetic field that is incident on the metasurface of the mode converting device, where the incident electromagnetic field is defined in spatial domain;

defining a desired electromagnetic field exiting the metasurface of the mode converting device, where the desired electromagnetic field is defined in the spatial domain;

converting the incident electromagnetic field and the desired electromagnetic field from the spatial domain to a modal domain;

relating the incident electromagnetic field in the modal domain to the desired electromagnetic field in the modal domain using modal network theory, where a modal network describes modal properties of each reactance sheet and dielectric spacing between reactance sheets; and determining reactance profiles for each reactance sheet through an optimization of the modal network.

* * * * *